March 1, 1966  J. WOTTON  3,237,891
JET-PROPULSION POWER-PLANTS FOR AIRCRAFT
Filed May 13, 1964  6 Sheets-Sheet 3

March 1, 1966  J. WOTTON  3,237,891
JET-PROPULSION POWER-PLANTS FOR AIRCRAFT
Filed May 13, 1964  6 Sheets-Sheet 4

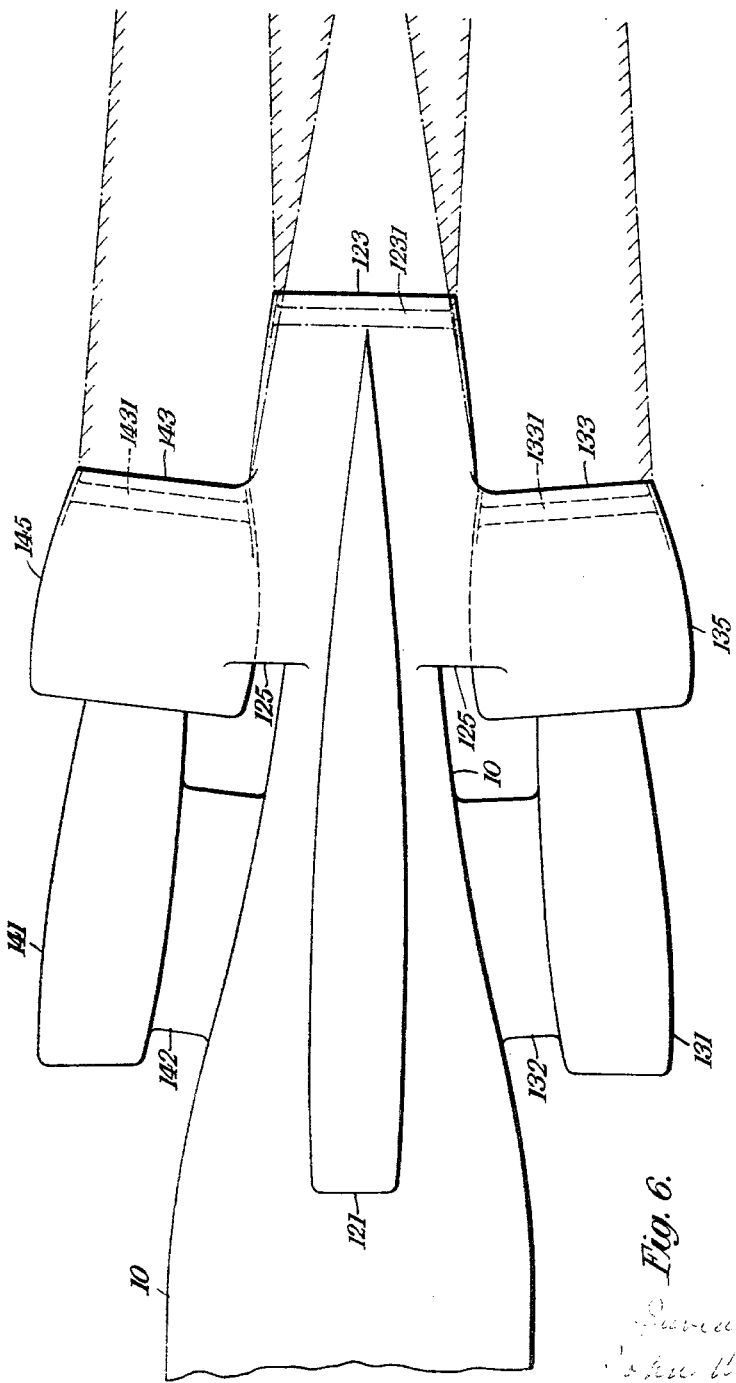

March 1, 1966  J. WOTTON  3,237,891
JET-PROPULSION POWER-PLANTS FOR AIRCRAFT
Filed May 13, 1964  6 Sheets-Sheet 6

United States Patent Office 3,237,891
Patented Mar. 1, 1966

3,237,891
JET-PROPULSION POWER-PLANTS FOR AIRCRAFT
John Wotton, Weybridge, Surrey, England, assignor to British Aircraft Corporation (Operating) Limited, London, England, a British company
Filed May 13, 1964, Ser. No. 367,136
2 Claims. (Cl. 244—55)

The specification of my co-pending patent application describes an improved form of a turbo-fan engine having at its after end a supplementary turbo-fan unit disposed co-axially with said engine, and an annular cowl surrounding said supplementary turbo-fan unit and arranged to receive boundary layer air from the engine nacelle or from parts of the aeroplane fuselage ahead of said nacelle, the rotor of said supplementary turbo-fan unit being furnished with fan blades which extend into, and on rotating, sweep the interior of said cowl to ingest said boundary layer air therein.

It is proposed according to the present invention to utilise improved engines as described in said co-pending patent application in an aircraft propulsion installation having three propulsion units, i.e. one central engine buried in the tail end of the fuselage, and two outboard units respectively mounted in nacelles or pods attached to the sides of the fuselage at opposite sides of said central engine. The cowl of the central engine may take the form of a cuff intake surrounding the after part of the fuselage in which the central engine is housed, so that the supplementary turbo-fan unit thereof ingests boundary layer air flowing over the fuselage skin. The cowls of the outboard engine units receive boundary layer air flowing over the surfaces of the respective engine nacelles or pods and over any surfaces of the fuselage lying immediately ahead of such cowls.

A further feature of the invention consists in the relative disposition of the engine-units, and the formation of their efflux nozzles, in such manner that interference drag due to the juxtaposition of the respective engine housings is minimized. For this purpose the outboard engines are mounted so that their thrust-lines, when viewed in plan, are directed outwardly in a forward direction, and the cross-section of the efflux nozzles of all three engine-units is elliptical, the major axes of the ellipses lying in the horizontal plane.

Figure 1:
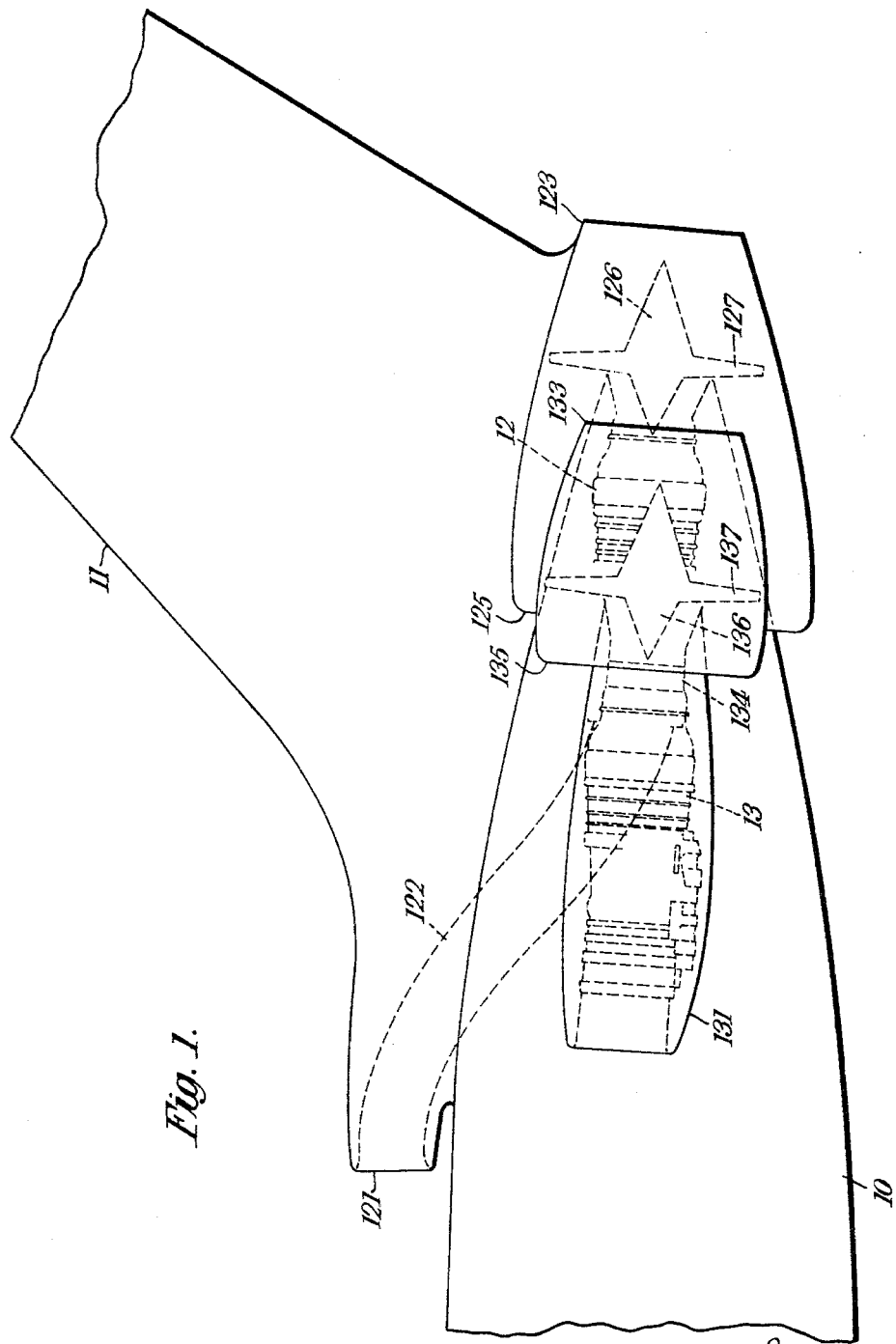
Figure 2:
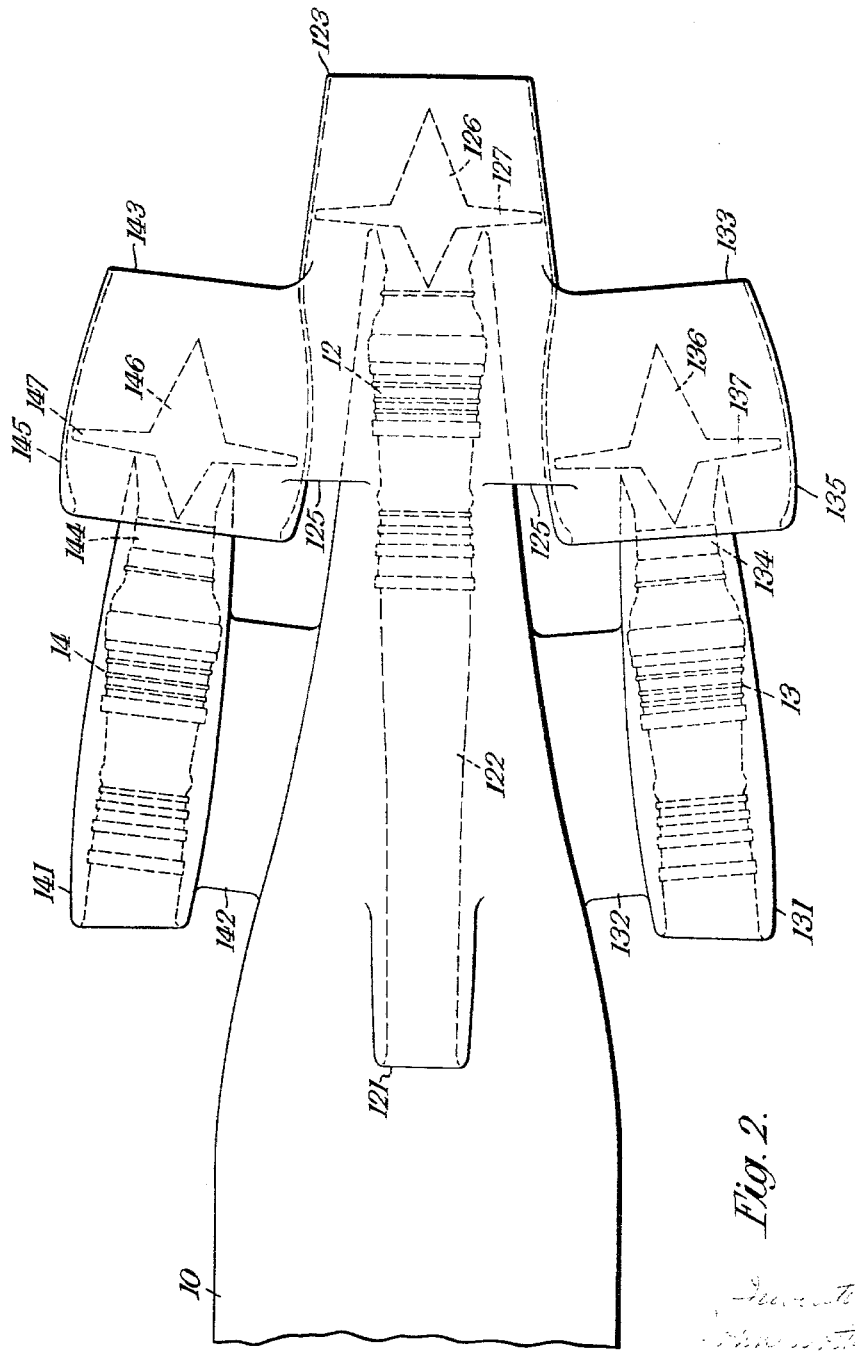
Figure 3:
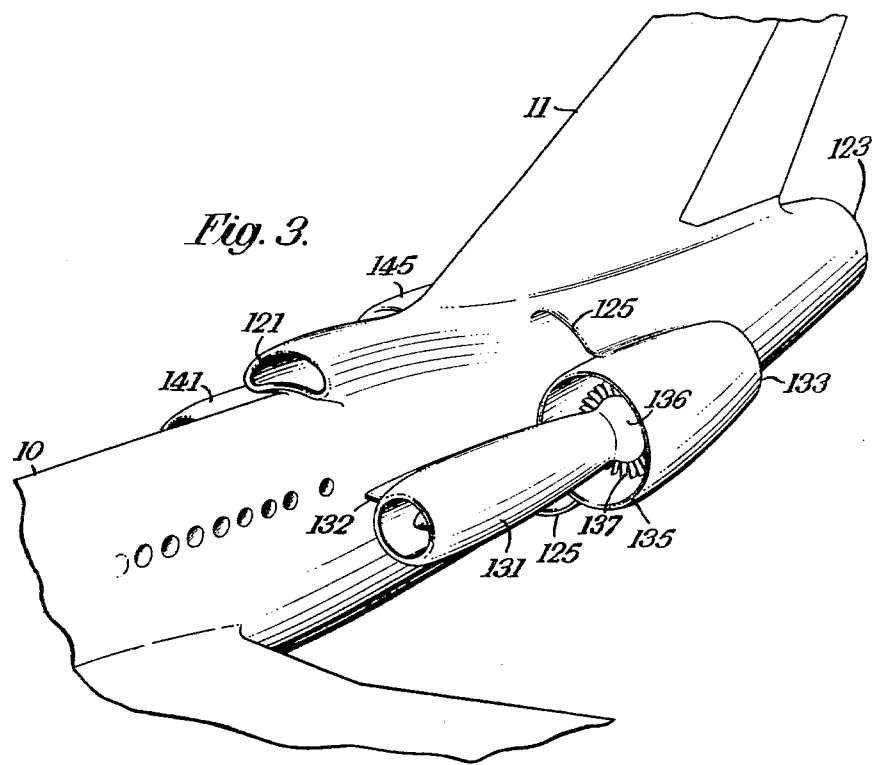
Figure 5:
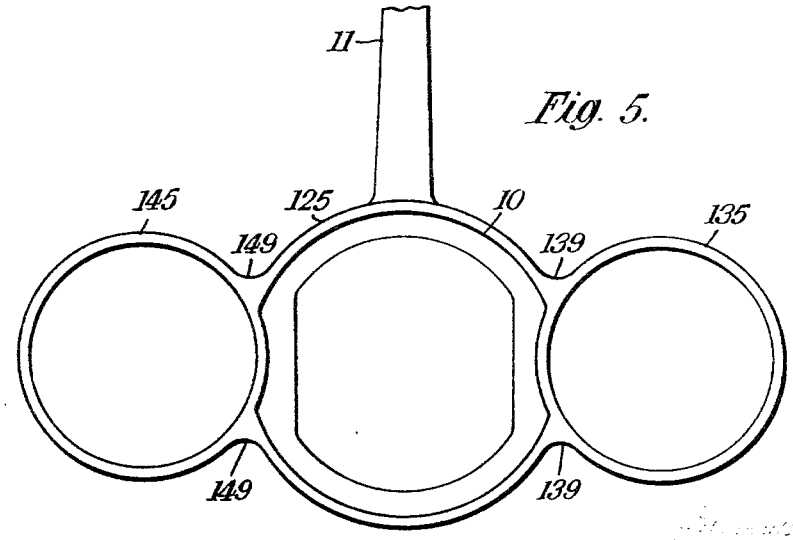
Figure 4:
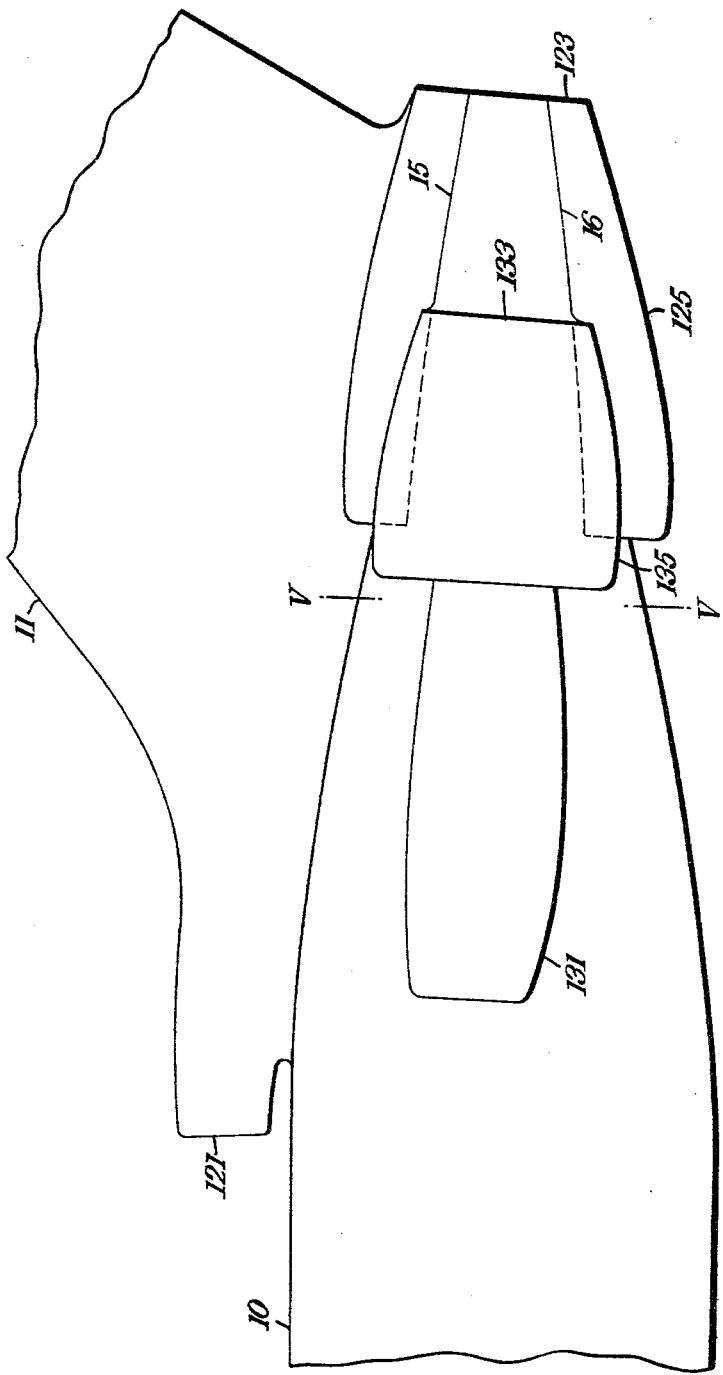

The manner in which the invention may be carried into effect is hereinafter described with reference to the accompanying diagrammatic drawings, in which FIG. 1 is a side elevation, FIG. 2 a plan and FIG. 3 a three-quarter front view of the after end of an aircraft having a triple unit jet-propulsion installation in accordance with the invention. FIG. 4 is a side elevation, FIG. 5 a section on the line V—V of FIG. 4, the engine-units themselves being omitted, FIG. 6 a plan and FIG. 7 a rear view of a modified embodiment of the invention. FIG. 8 is a view similar to FIG. 3, of a further modification.

In the drawings the after part of the aeroplane fuselage is indicated by the reference numeral 10, and the fin member of the empennage by the numeral 11. The aircraft is propelled by three turbo-fan engines, viz. an engine 12 which is buried in the rear extremity of the fuselage with its thrust-line in the plane of symmetry, its air intake being located at 121 in the free stream at the root of the leading edge of the fin 11 and connected with the engine by a duct 122, and its efflux jet extending afterwards at 123, and two outboard engines 13 and 14 which are respectively enclosed in nacelles or pods 131, 141 mounted by means of brackets 132, 142 on either side of the fuselage part 10 nearly abreast of the central engine 12. The efflux nozzles of the engines 13 and 14 are indicated at 133, 143. The thrust-lines of the engines 13, 14 are preferably angled outwardly as indicated in FIG. 2, and these engines incorporate thrust-reversal units at 134, 144.

Each of the three engines is fitted with an external cowl, respectively indicated at 125, 135 and 145, which is so arranged as to receive boundary layer air flowing over the surfaces of the fuselage 10 (in the case of the central engine 12) or the surfaces of the nacelles 131 and 141 (in the case of the engines 13 and 14) lying ahead of the cowl intake. The three engines are respectively provided with supplementary turbo-fan unit 126, 136 and 146 in the manner described in the said co-pending patent application, and the fan components thereof are furnished with blades, respectively denoted by the numerals 127, 137 and 147, which extend into and, on rotating, sweep the interiors of the respective cowls 125, 135, 145 so as to ingest the boundary layer air received therein and to expel such air together with the gas efflux from the engines through the nozzles 123, 133, 143.

In the modified arrangement shown in FIG. 8, the fan unit of the central engine 12 is provided with an additional cowl 128 which is arranged to receive boundary layer air flowing over the surfaces of the main cowl 125.

Figure 7:
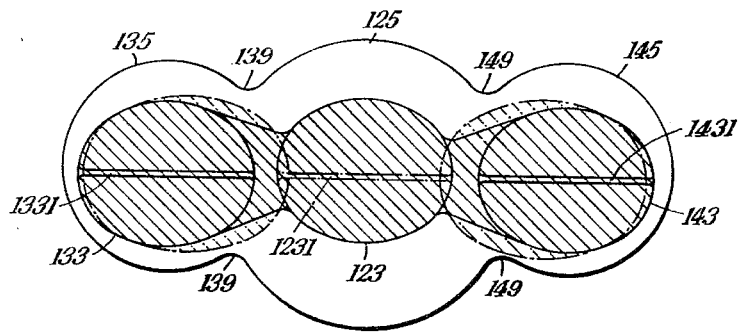
Figure 8:
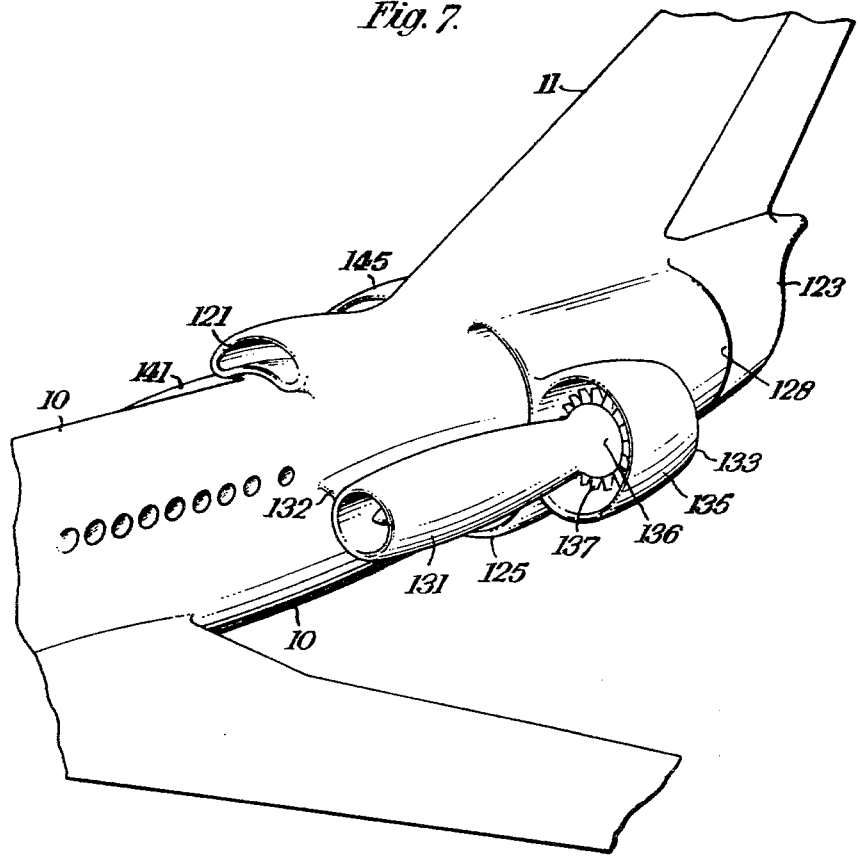

The modified embodiment illustrated in FIGS. 4 to 7 is designed to minimize the interference drag which results from the proximity of the outboard engine cowls 135, 145 with the surfaces of the fuselage 10 and the central engine cowl 125. As will be seen from FIG. 5 the integration of the structure leads to the formation of gulleys 139, 149 on the upper and under sides, and it is important that the parts of the air stream which flow along said gulleys should be preserved from abrupt vertical deflection on leaving the gulleys. This is achieved partly by the angled disposition of the outboard engines and the integration of the cowls 125, 135, 145 as shown, and partly by the elliptical formation of the efflux nozzles 123, 133, 143 which is shown in FIG. 7. Such an arrangement ensures that the inboard edge of the efflux jet of each outboard engine 13 or 14 remains in contact with the adjacent outer surface of the cowl 125 of the central engine 12. Each outboard engine jet merges at the after extremity of the aircraft with the central engine jet, so as eventually to form a trilobal single jet. It will be seen from FIG. 4 that the surface of the centre cowl 125 which is swept by the jet from the outboard engine nozzle 133, is defined by lines 15 and 16 which are linear continuations of the gulleys 139, 149, along which the enveloping airstream flows smoothly substantially parallel to the line of flight.

A further advantage derived from the aforedescribed elliptical configuration of the jet nozzles arises from the fact that the outer peripheral surfaces of the outboard engine cowls 135, 145 are so disposed as to reduce the inward sweep of such surfaces due to the angled mounting of the engines. The elliptical shape of the nozzles may be maintained by means of struts 1231, 1331 and 1431, arranged to coincide with the major axes of the ellipses. If desired means may be provided for adjusting the lengths of said struts in such manner as to permit variation of the terminal cross-sectional areas of the nozzles.

The improved arrangement herein described enables the greater propulsive thrust of the aft-mounted turbofan engine to be used to increase the performance of an aircraft, either by substituting such engines for the conventional by-pass engines, or by reducing the total number of engines and/or by modifying their layout in the aircraft.

What I claim as my invention and desire to secure by Letters Patent is:

1. An aircraft jet-propulsion engine installation including a central engine buried in the tail end of the fuselage, two nacelles attached to opposite sides of the fuselage laterally of said central engine, an engine mounted within each of said nacelles, the thrust lines of said nacelle mounted engines being angled outwardly in plan towards the front of the aircraft, all of said engines being of the turbo-fan type having at their after ends a co-axially disposed supplementary turbo-fan unit, annular cowls surrounding each of said supplementary turbo-fan units, the cowls surrounding the supplementary turbo-fan units of said nacelle mounted engines being integrated with the cowl surrounding the supplementary turbo-fan unit of said central engine, and all three of said cowls having efflux jet-nozzles of elliptical cross-section with their major axes lying in the horizontal plane.

2. An installation according to claim 1, further comprising a plurality of struts provided at the efflux jet-nozzles and coinciding with the major axes of the elliptical cross-section thereof.

References Cited by the Examiner

UNITED STATES PATENTS

| 2,863,620 | 12/1958 | Vautier | 244—55 |
| 3,038,683 | 6/1962 | Rowe | 244—12 |
| 3,117,748 | 1/1964 | Gerlaugh | 60—35.6 |

MILTON BUCHLER, *Primary Examiner.*

FERGUS S. MIDDLETON, *Examiner.*

L. C. HALL, *Assistant Examiner.*